United States Patent [19]

Giller et al.

[11] Patent Number: 4,542,186

[45] Date of Patent: Sep. 17, 1985

[54] PROCESS FOR THE PREPARATION OF REINFORCED RUBBER VULCANISATES AND THE USE THEREOF

[75] Inventors: Arnold Giller, Taunusstein; Joachim Weil, Wiesbaden, both of Fed. Rep. of Germany

[73] Assignee: Hoechst Aktiengesellschaft, Fed. Rep. of Germany

[21] Appl. No.: 243,384

[22] Filed: Mar. 13, 1981

[30] Foreign Application Priority Data

Mar. 15, 1980 [DE] Fed. Rep. of Germany ....... 3010001

[51] Int. Cl.$^4$ .......................... C08L 7/00; C08L 9/00
[52] U.S. Cl. ................................... 525/138; 524/511
[58] Field of Search ............................ 260/3; 525/138

[56] References Cited

U.S. PATENT DOCUMENTS

| 3,194,294 | 7/1965 | van Gils | 152/330 |
| 3,638,702 | 2/1972 | Endter | 152/330 |
| 3,951,887 | 4/1976 | Tanimura | 260/3 |

FOREIGN PATENT DOCUMENTS 013330 11/1979 European Pat. Off. .

OTHER PUBLICATIONS

Martin, R. W. *The Chemistry of Phenolic Resins*, pp. 87–88, John Wiley & Sons, N.Y. 1956.

*Primary Examiner*—John C. Bleutge
*Assistant Examiner*—Patricia Short
*Attorney, Agent, or Firm*—Bierman, Peroff & Muserlian

[57] ABSTRACT

In a process for the preparation of reinforced vulcanisates by vulcanisation of compositions comprising natural rubber or synthetic diene rubber with novolak resins in the presence of from 0.5 to 120% by weight, based on the novolak resin, of a hardener of a reactive melamine resin obtained by reacting melamine with 0.5 to 6 mol of an aldehyde the improvement comprises that, instead of or together with the reactive melamine resins other aminoplast forming compounds containing hydroxy groups are used and the total amount of the aminoplast-forming compounds is also from 0.5 to 120% by weight, referred to novolak resin, a rubber article and vehicle tire prepared according to this process.

10 Claims, No Drawings

PROCESS FOR THE PREPARATION OF REINFORCED RUBBER VULCANISATES AND THE USE THEREOF

Published European Patent Application No. 13 330 describes the preparation of reinforced rubber vulcanisates by vulcanising compositions comprising natural rubber or synthetic diene rubber with novolak resins in the presence of from 0.5 to 120% by weight (based on the novolak resin) of hardeners of reactive melamine resins, which melamine resins are obtained by reacting 1 mol of melamine with 0.5 to 6 mol of an aldehyde. The phenolic component of the novolak resin is selected from the group consisting of phenol, polyvalent polynuclear phenols, alkylphenols, mixtures of alkylphenols with phenol, and possibly also containing added amounts of resorcinol, phenylphenol or polyalkylphenols. This same Specification also describes the use of the vulcanisates prepared according to this process for the production of industrial rubber products and vehical tires.

It has now been found that, in a process for the preparation of reinforced vulcanisates by vulcanising compositions comprising natural rubber or synthetic diene rubber with novolak resins in the presence of from 0.5 to 120% by weight (based on the novolak resin) of hardeners of reactive melamine resins, which melamine resins are obtained by reacting 1 mol of melamine with 0.5 to 6 mol of an aldehyde, it is also possible to obtain reinforced rubber vulcanisates having good properties, more particularly a high reinforcing effect, if, according to the present invention, instead of or together with the above-mentioned melamine resins, other aminoplast-forming compounds containing hydroxyl groups are used, the total amount of aminoplast-forming compounds also being from 0.5 to 120% by weight, based on the novolak resin.

Examples of other aminoplast-forming compounds containing hydroxyl groups include polymethylolureas, mixed condensates of melamines, urea or other aminoplastforming compounds and formaldehyde, and products obtained by reacting melamine with more than 6 mol, e.g. 8 mol, of an aldehyde, preferably formaldehyde, or the ethers, preferably the methyl ethers of all these products. Examples of other aminoplast-forming compounds which may be used thus include those wherein more than 1 mol of formaldehyde is added to some of the NH bonds of melamine, and the non-etherified or etherified methylol compounds of the available guanamines such as aceto-, benzo- or formoguanamine. An example of such a product is tetramethoxymethylbenzoguanamine, which may be obtained in solid form.

The preferred aminoplast-forming compounds are those which are obtained by reacting 1 mol of urea with 2 to 4 mol of formaldehyde.

Having regard to their compatibility with rubbers, the particularly preferred compounds are those wherein the methylol groups are at least partially etherified by being reacted with one or more monohydric alcohols having 1 to 12, preferably 1 to 8 carbon atoms, such as, for example, methanol, ethanol, the various propanols and butanols, ethylhexyl alcohol, n-octanol, nonanol and dodecyl alcohol.

Especially preferred are liquid, etherified, highly methylolated urea derivatives prepared in a two-step process by reacting 1 mol of urea with more than 6 mol of formaldehyde at a pH of more than 8 and at a temperature of 45° to 70° C., and then reacting the reaction product of this first step with more urea in a second step, so that an additional 25 mol-% of urea are used to the total molar amount of formaldehyde minus 4 mol. In order to prepare ethers, the reaction mixture is preferably further reacted with one or more monohydric aliphatic alcohols, e.g. those mentioned hereinbefore, according to conventional methods, under acidic conditions and at a temperature not exceeding 50° 1 C.

Advantageously, the water content of the reaction product is adjusted to not more than 5%, preferably less than 1%.

Examples of melamine resins which may be used in conjunction with the other amine resins include those which can be obtained by reacting 1 of melamine with 0.5 to 6 mol of an aldehyde, preferably formaldehyde. Hexamethoxymethylmelamine or corresponding higher condensed polynuclear products or at least partially etherified trimethylol-, tetramethylol- or pentamethylol-melamine resins are preferred. The degree of condensation of all aldehyde resins, more particularly formaldehyde resins, and their content of free alkylol, more particularly methylol groups, can be regulated in the usual way by suitable adjustment of the reaction medium.

Under the vulcanisation conditions, the aminoplast-forming compounds used according to the invention can cure the novolaks contained in the rubber mixture. If mixtures containing the melamine resins mentioned in European application specification No. 13 330, or mixed condensates containing melamine are used, the weight ratio of urea to melamine in the reaction with aldehyde is advantageously at least 1:1. Moreover, the use of the amine resins according to the invention has the advantage that the vulcanisates have better adhesion to metal, e.g. metal reinforcing elements.

Examples of novolaks which may be used are those wherein the phenolic component consists essentially of phenol, polyhydric polynuclear phenols, such as bisphenols, e.g. diphenylolpropane or diphenylolmethane or the homologues thereof, or mixtures of phenol and alkylphenols, such as tert.butylphenol, octylphenol or nonylphenol, which are obtained by condensation with aldehydes, preferably formaldehyde, under acidic conditions. The phenolic component may also contain added amounts of resorcinol, phenylphenol or polyalkyl-phenols. These additives may be incorporated in amounts such that the molar ratio of the total quantity of additives to the total amount of the other phenols is up to 1:1, advantageously up to 1:2.

The novolaks may also contain plasticising components, such as, for example, polyethylene glycol, colophony, tall oil or other plasticisers, or may be modified with natural resinic acids or olefinically unsaturated hydrocarbons such as styrene. In theory, it is also possible to use novolak resins prepared exclusively from alkylphenols having one alkyl group with 2 to 12 carbon atoms. However, these can only be used in certain conditions, since they are less hardenable. For practical use, novolak resins obtained from phenol and mixtures of phenol with cashew nutshell oil, and from phenol with alkylphenols having 4 to 12 carbon atoms in the alkyl moiety, more particularly p-tert.butyl-, octyl- or nonylphenol, are preferred. The proportion of substituted phenols in the novolak may vary, but the novolak should still be hardenable. Thus, in general, a proportion of alkylphenol of not more than 70 mol-% of the total phenolic component will be used.

The proportion of novolak is generally 1 to 30, preferably 3 to 20% by weight, based on the rubber. In individual cases, larger amounts, e.g. 100% by weight or more, based on the rubber, may also be used. With such a high proportion of novolak, hard products are obtained which differ substantially from conventional highly elastic rubber vulcanisates in their properties.

In principle, the optimum quantities of aminoplast-forming compounds required to cure the novolak resins have to be determined in preliminary tests which may be readily carried out. In general, about 1 to 80, preferably 2 to 50% by weight of aminoplast-forming compounds are required, to 100 parts by weight of novolak resin.

In the process according to the invention, it is also possible to use solid powdered products such as methylol aminoplast compounds. In this case, the effect of these compounds depends, to a critical extent, on the fineness of the particles, the products used generally having a particle size of not more than 100 μm, preferably not more than about 50 μm. Products of this kind can be prepared relatively easily in dissolved form. However, these types are only suitable for incorporation in rubbers to a limited extent since they would have to be incorporated with conventional low boiling solvents such as higher alcohols, water or esters which evaporate in the course of the mixing process. On the other hand, for example, certain polyglycols or oily aromatic or aliphatic hydrocarbons or high boiling polyethers may be co-used.

It is frequently advantageous to reinforce or accelerate the activity of the aminoplast-forming compounds proposed according to the invention by the addition of suitable acids. Examples of such acids include mono- or dibasic organic acids with at least 2 and not more than 20 carbon atoms or the anhydrides thereof, e.g. phthalic acid, benzoic acid, maleic acid, fumaric acid, tri- or pyromellitic acid and the anhydrides thereof, or sulphonic acids such as naphthalenedisulfonic acid of sulfanilic acid.

Instead of, or together with the organic acids, it is also possible to co-use polyester resins obtained from polycarboxylic acids and polyhydric alcohols with an acid number of 20 or more, e.g. up to 100, which may also be modified by monocarboxylic acids and monohydric alcohols. However, the proportion of monofunctional components should be not more than 25 equivalent-%, based on the acid or alcohol component.

The organic acids or polyester resins used as accelerators may be added in amounts of from 0.1 to about 5, preferably 1.5 to 3% weight, based on the rubber. However, it is certainly possible to add larger or small amounts of acid to obtain a controlled modification of the activity.

Theoretically, curing may also be accelerated by means of strong inorganic acids such as phosphoric acid or acid esters of phosphoric acid. However, this method is less appropriate on account of the precautions which must be taken when handling such acids. Frequently, the co-use of the acids results in a more intensive reinforcing effect than would be obtained if they were not co-used. In the vulcanisates prepared according to the invention, this reinforcing effect is particularly apparent as an increase in the tension values at 100% expansion and an increase in the hardness of the vulcanisate.

Instead of, or together with the acids, plasticisers, as conventionally used in the processing of rubber, may also be added, for example aromatic polyethers, esters of phthalic acid or the like.

Examples of rubbers which may be used in the invention include, for example, natural rubber, polyisoprene, styrene rubber, acrylonitrile rubber, polybutadiene, butyl rubber, ethylene-propylene-diene terpolymer rubber or mixtures thereof, as conventionally used in the tire industry or for the production of industrial rubber goods.

As fillers, the standard commercial active or inactive carbon blacks, silicic acids, kaolins, chalk or other conventional fillers may be co-used if desired.

For vulcanisation, sulphur is generally used together with the known accelerators. In many cases, however, the vulcanisation can be done without sulphur. However, vulcanisation in the presence of sulphur is preferred. The course of vulcanisation may be adapted to the practical requirements by a suitable choice of accelerators conventionally used in rubber technology.

The mixtures produced according to the invention may be prepared in the conventional way in internal mixers or on mixing rolls. During incorporation, care should generally be taken to ensure that the mixing temperature does exceed the melting point of the fusible solid substances, particularly the novolak resins, at any stage during the preparation of the mixture, so as to ensure that these substances are fully distributed. It is also generally important that the aminoplast-forming compounds proposed as hardeners according to the invention are incorporated in such a way that premature condensation of these compounds themselves or premature reaction with the novolak which is to be cured does not occur. This may be achieved by incorporating them at the end of the mixing operation at temperatures which are not excessively high. The temperature depends on the type used, the quantity of acid and the length of time and is generally 80° C. to 120° C., preferably over 100° C. In individual cases, it may also be higher, e.g. if no acid is present, or lower. However, it is also possible to effect curing of the novolak resins with the aminoplast-forming compounds used according to the invention in a separate operation by hot-rolling the mixture before the vulcanisation accelerator is added.

The use of the aminoplast-forming compounds in the process according to the invention, enables the curing process to proceed favorably during vulcanisation.

Industrial rubber articles, particularly those with metal inserts, may be produced from the mixtures prepared according to the invention; these mixtures may also be used for the production of vehicle tires.

The following Examples serve to illustrate the invention, and in these Examples the amounts stated are parts by weight.

| Mixture | Examples 1 to 6 comparison | 1 | 2 | 3 | 4 | 5 | 6 |
|---|---|---|---|---|---|---|---|
| Styrene-butadiene rubber (1) | 100 | 100 | 100 | 100 | 100 | 100 | 100 |
| Carbon black N-330 (1) | 50 | 50 | 50 | 50 | 50 | 50 | 50 |
| Stearic acid | 1.5 | 1.5 | 1.5 | 1.5 | 1.5 | 1.5 | 1.5 |
| Zinc oxide | 5.0 | 5.0 | 5.0 | 5.0 | 5.0 | 5.0 | 5.0 |

-continued

| Mixture | Examples 1 to 6 comparison | 1 | 2 | 3 | 4 | 5 | 6 |
|---|---|---|---|---|---|---|---|
| Anti-ageing agent | 2.0 | 2.0 | 2.0 | 2.0 | 2.0 | 2.0 | 2.0 |
| Sulphur | 2.0 | 2.0 | 2.0 | 2.0 | 2.0 | 2.0 | 2.0 |
| Phenol novolak (2) | — | 14.0 | 14.0 | 14.0 | 14.0 | 14.0 | 14.0 |
| Mixed melamine-urea ether A (3) | — | 6.0 | — | — | — | — | — |
| Mixed melamine-urea ether B (4) | — | — | 6.0 | — | — | — | — |
| Mixed melamine-urea ether C (5) | — | — | — | 6.0 | 6.0 | — | — |
| Urea ether (6) | — | — | — | — | — | 6.0 | 6.0 |
| Benzoic acid | — | 3.0 | 3.0 | — | 3.0 | — | 3.0 |
| Cyclohexylaminothiobenzothiazole | 1.0 | 1.0 | 1.0 | 1.0 | 1.0 | 1.0 | 1.0 |
| Tetramethylthiurammonosulfide | 0.2 | 0.2 | 0.2 | 0.2 | 0.2 | 0.2 | 0.2 |
| Vulcanisation (°C.) | 145 | 145 | 145 | 145 | 145 | 145 | 145 |
| Vulcanisation (min) | 30 | 30 | 30 | 30 | 30 | 30 | 30 |
| Tearing strength (MPa) | 22.2 | 21.6 | 23.4 | 22.2 | 20.6 | 22.8 | 20.0 |
| Tearing expansion (%) | 251 | 293 | 312 | 327 | 283 | 315 | 265 |
| Tension values at 100% expansion (MPa) | 5.3 | 7.5 | 7.8 | 6.0 | 7.8 | 6.9 | 8.4 |
| Tension values at 200% expansion (MPa) | 16.3 | 15.0 | 15.0 | 12.5 | 14.4 | 14.1 | 15.3 |
| Shore hardness A (°) | 74 | 91 | 92 | 88 | 90 | 88 | 92 |
| Resilient elasticity (%) | 36 | 33 | 33 | 33 | 33 | 32 | 34 |

| Mixture | Examples 7 to 10 | | | |
|---|---|---|---|---|
| | 7 | 8 | 9 | 10 |
| Natural rubber (7) | 100 | 100 | 100 | 100 |
| Carbon black N 330 (8) | 50 | 50 | 50 | 50 |
| Stearic acid | 2 | 2 | 2 | 2 |
| Zinc oxide | 5 | 5 | 5 | 5 |
| Anti-ageing agent | 2 | 2 | 2 | 2 |
| Sulphur | 2,5 | 2,5 | 2,5 | 2,5 |
| Phenol novolak (9) | 14 | 7 | 14 | 7 |
| Urea ether (10) | 6 | 3 | — | — |
| Urea ether (11) | — | — | 6 | 3 |
| Cyclohexylaminothiobenzothiazole | 0.7 | 0.7 | 0.7 | 0.7 |
| Tetramethylthiurammonosulfide | 0.2 | 0.2 | 0.2 | 0.2 |
| Benzoic acid | 1.0 | 0.5 | 1.0 | 0.5 |
| Vulcanisation (°C.) | 145 | | 145 | |
| Vulcanisation (min) | 25 | | 25 | |
| Tearing strength (MPa) | 18.8 | 25.0 | 15.3 | 21.3 |
| Tearing expansion (%) | 298 | 385 | 242 | 309 |
| Tension value at 50% expansion (MPa) | 3.8 | 2.8 | 4.4 | 3.1 |
| Tension value at 100% expansion (MPa) | 6.3 | 4.7 | 6.6 | 5.0 |
| Shore hardness (°) | 89 | 84 | 92 | 85 |
| Resilient elasticity (%) | 30 | 31 | 31 | 32 |

REMARKS ON THE TABLES

1. Styrene-butadiene rubber containing resin and fatty acid with 23.5% bound styrene; carbon black for high abrasive resistance. The rubber and carbon black are used as a master batch consisting of 100 parts rubber and 50 parts carbon black.

2. Standard commercial phenol novolak with a melting point (by the capillary method) of 80° to 88° C.

3. Methylol compound consisting of 1 mol urea, 1.12 mol melamine and 10.72 mol of approx. 39% aqueous formaldehyde solution, prepared by condensation under alkaline conditions by conventional methods and subsequent etherification with 32 mol of methanol in the conventional manner at a pH of <3.

4. Like mixed ether A, but etherified with only half the amount of methanol.

5. In a two-step process, urea is reacted with eight times its molar quantity of aqueous formaldehyde solution (approx. 39%) at a pH of >10 according to the usual method. 10 mol % of melamine, based on mols (total formaldehyde -4), are added to the reaction mixture. The resulting reaction mixture is substantially concentrated and etherified with 20 mol methanol, based on the total mols of melamine and urea, under the usual conditions and then adjusted to a water content of <1%.

6. Reaction product of urea with 3 mol formaldehyde, partially etherified; viscosity approx. 10 Pa.s at 25° C., based on a solids content of 98.8% at 50° C. for 1 h in vacuo; prepared by the usual method.

7. Sheet quality produced by the SMR method, with a maximum content of volatile components of 0.8% and a hot scale of not more than 0.6%.

8. Same types as in Examples 1 to 6, but incorporated separately.

9. Standard commercial phenol novolak with a dynamic viscosity according to DIN 53 177 at 20° C., 40% in monoethylene glycol monoethyl ether, of 170-250 mPa.s.

10. Dimethylolurea dimethyl ether (cf. Houben-Weyl, Volume XIV/1 (1963), page 348, Example 4), as a flowing 70% powder prepared by applying the liquid resin to a silicic acid with a specific surface area of 190 m$^2$/g and an average size for the primary particles of $18 \times 10^{-9}$ m.

11. See 6., but as a flowing 70% powder according to 10.

DISCUSSION OF THE RESULTS

Examples 1 to 6 show the results obtained with a conventional rubber mixture based on a styrene-butadiene rubber and using a standard commercial phenol novolak and the aminoplast compounds according to the invention as hardeners. The reinforcing effect is demonstrated by comparison with a vulcanisate to which the phenol novolak-aminoplast combination claimed according to the invention has not been added.

Examples 1 and 2 shows the reinforcing effect with hardeners consisting of mixed ethers of melamine and urea containing a smaller amount of urea in relation to the amount of melamine, the ether according to Example 2 being less etherified.

Examples 4 and 6 show the increase in hardness and tension values compared with Examples 3 and 5 and thus demonstrate the good reinforcing effect obtained by co-using an acid.

A property common to all the phenol novolak-aminoplast combinations claimed according to the invention is the fact that they significantly reinforce rubber mixtures. This is clear from the increased tension values, particularly during slight expansion, and the significant increase, generally by 14 to 18 points, in the degree of hardness of the vulcanisates. This also applies to other rubber mixtures, e.g. natural rubber mixtures (cf. Examples 9 to 12).

The results show that the novolak-aminoplast combinations proposed according to the invention bring about reinforcing effects which can be achieved under similar conditions with hexamethylenetetramine as the hardener, but do not have the disadvantages connected with the use of hexamethylenetetramine. Thus, for example, no intermediate formation of ammonia can occur. As a result, any metal inserts are not exposed to resultant corrosion or reduction in their adhesion to the rubber.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. In a process for the preparation of reinforced vulcanizates by vulcanization of compositions comprising natural rubber or synthetic diene rubber with novolak resins in the presence of sulfur as a vulcanizing agent in conjunction with a known acelerator and of from 2 to 120% by weight, based on the novolak resin, of a hardener for the novolak resin being an aminoplast forming compound containing hydroxyl groups other than a reactive melamine resin obtained by reacting one mole of melamine with 0.5 to 6 moles of an aldehyde or a mixture of such other aminoplast with said reactive melamine resin obtained by reacting 1 mol of melamine with 0.5 to 6 mols of an aldehyde, the novolak resin being present in the final composition in an amount of from 1 to 30% by weight based on the rubber, and the phenolic component of said novolak resin being selected from the group consisting of phenol, bisphenols, alkylphenols having one alkyl group with 2 to 12 carbon atoms, a combination of alkylphenols with phenol, and a combination of at least one of said phenols with a further phenol selected from the group consisting of resorcinol, phenylphenol and poly-alkylphenols, said further phenols being employed in such a quantity that the molar ratio of the total quantity of the further phenols to the total quantity of the other phenols is not more than 1:2.

2. A process as claimed in claim 1, wherein the novolak resin has been at least partially added at a mixing temperature above the melting point of the novolak resin.

3. A process as claimed in claim 1, wherein the aminoplast forming compound is used in the form of ethers in which methylol groups are at least partially etherified with monohydric alcohols having from 1 to 12 carbon atoms.

4. A process as claimed in claim 1, wherein the total amount of the aminoplast forming compound is between 2 and 80% by weight based on the novolak resin.

5. A process as claimed in claim 1, wherein the vulcanisation is performed in the presence of an acid component selected from the group consisting of inorganic and at most dibasic organic acid components having from 2 to 10 carbon atoms and polyester resins having an acid number of at least 20.

6. A process as claimed in claim 5, wherein the amount of the organic acid component is between 0.1 and 5% by weight, based on the rubber.

7. A process as claimed in claim 1, wherein a composition is vulcanized in which the total phenol component of the novolak contains an amount of at most 70 mol-% of alkylphenol.

8. A process as claimed in claim 1, wherein a composition is vulcanized containing the novolak in an amount of between 3 and 20% by weight, based on the rubber.

9. A process as claimed in claim 1, wherein a molded composition containing metal reinforcing elements is vulcanized.

10. A rubber article and vehicle tire prepared according to the process as claimed in claim 1.

* * * * *